United States Patent [19]

Fischer

[11] 3,950,122

[45] Apr. 13, 1976

[54] APPARATUS FOR FINISHING SOAP BARS

[75] Inventor: Charles F. Fischer, Jersey City, N.J.

[73] Assignee: Colgate-Palmolive Company, New York, N.Y.

[22] Filed: Mar. 25, 1975

[21] Appl. No.: 561,823

Related U.S. Application Data

[63] Continuation of Ser. No. 384,084, July 30, 1973, abandoned.

[52] U.S. Cl. .............. 425/380; 425/464; 425/467
[51] Int. Cl.² ................................... B29F 3/04
[58] Field of Search ............ 259/191, 193; 264/75; 425/376, 377, 378, 379, 380, 209, 461, 464, 132, 131.1, 467

[56] References Cited
UNITED STATES PATENTS

| | | | |
|---|---|---|---|
| 579,939 | 3/1897 | Dawson et al. | 425/464 |
| 2,353,362 | 7/1944 | Rudd | 425/379 X |
| 2,469,999 | 5/1949 | Stober | 425/209 X |
| 2,511,203 | 6/1950 | Gliss | 259/193 |
| 3,471,906 | 10/1969 | Henry | 425/376 |
| 3,664,790 | 5/1972 | Hollander | 425/131.1 |
| 3,679,336 | 6/1970 | Bagley et al. | 425/131.1 X |
| 3,769,380 | 10/1973 | Wiley | 264/75 X |

*Primary Examiner*—R. Spencer Annear
*Assistant Examiner*—Mark Rosenbaum
*Attorney, Agent, or Firm*—Kenneth A. Koch; Murray M. Grill; Herbert S. Sylvester

[57] ABSTRACT

This invention relates to an apparatus for high intensity shear refining of soap in a soap extruder including at least one rotating auger in a housing for high intensity shear mixing of a mass soap ranging from 3,000 to 40,000 shear cuts per minute, the auger including a shank having a plurality of flights and kneader blocks. The soap extruder includes a housing having a barrel bore for receiving said auger with said auger terminating short of said bore to form a free space, an extrusion outlet extending from said bore, a nozzle plate is secured to said housing in alignment with said extrusion outlet. The nozzle plate has at least one inwardly tapering aperture of lesser diameter than that of said extrusion outlet.

5 Claims, 5 Drawing Figures

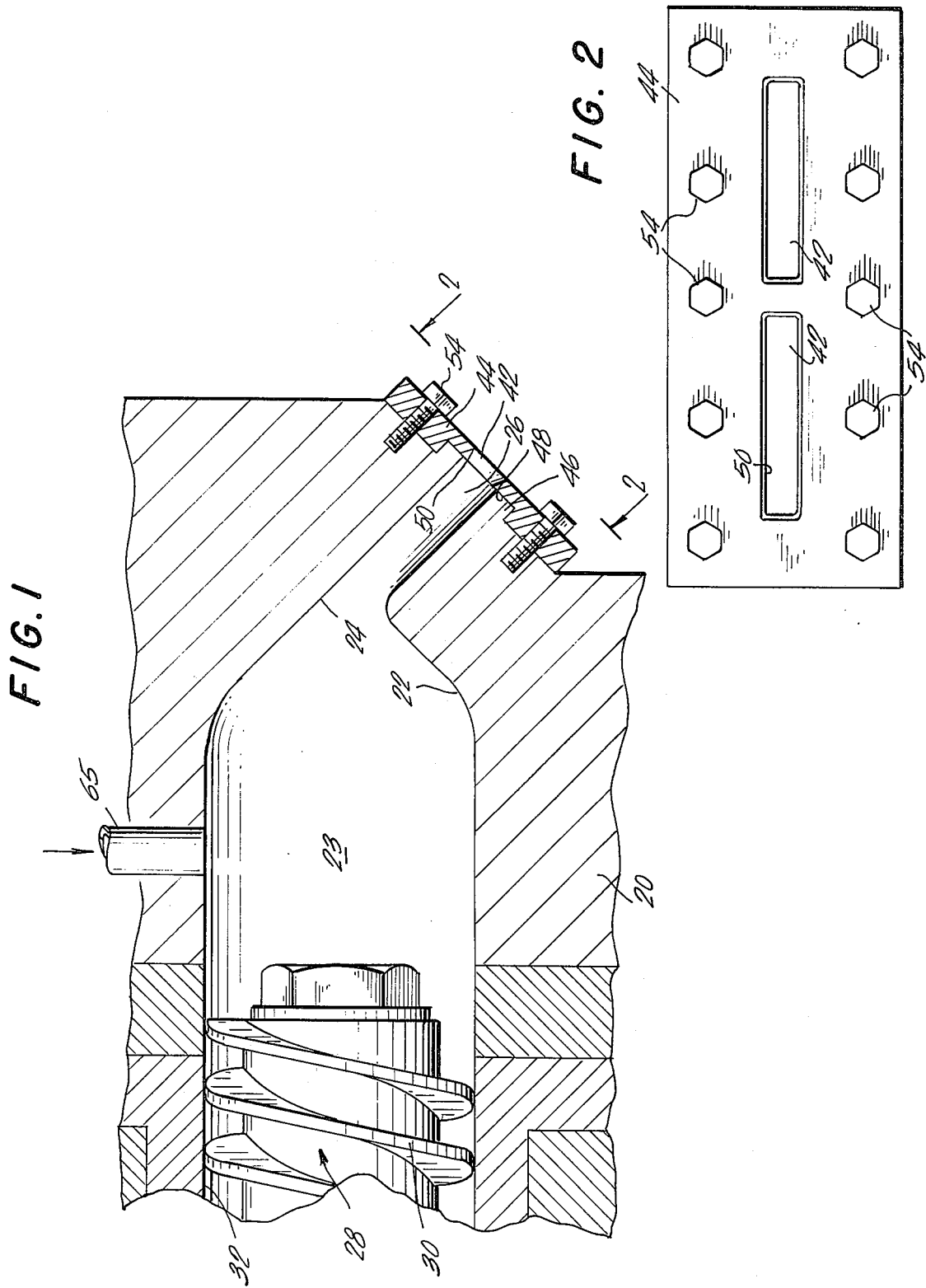

APPARATUS FOR FINISHING SOAP BARS

This is a continuation of application Ser. No. 384,084, filed July 30, 1973, now abandoned.

BACKGROUND OF THE INVENTION

1. Field of the Invention

This invention relates to a process and apparatus for finishing soap bars. More particularly, the invention relates to high intensity soap extursions including striated bar soap to obtain an improved surface finish.

2. Description of the Prior Art

Attempts have been made in the past to provide for the production of striated soap extrusions by directly attaching trimming means to the soap extruder housing. However, when soap is directly extruded from the housing against the wire trimming means, not only is a large amount of the soap mass cut off and either wasted or subjected to additional treatment, but it has been found that high-speed finishing of bat extrusions is not possible.

Soap extruders previously employed have operated with augers functioning at a rate in the order of less than 2000 cuts per minute on the finished product. If the number of cuts per minute were to be increased, in existing soap extruders, such would result in elimination of the possibility of producing striated soap while also increasing the temperature and pressure under which the soap is extruded as to deteriorate the product.

SUMMARY OF THE INVENTION

The present invention overcomes the problems of the prior art by providing for an apparatus for high intensity shear refining of soap including striated soap. The soap mass is mixed at a rate of from 3000 to 40,000 shear cuts per minute and because of the free space and the angularly disposed extrusion outlet, and the nozzle plate having a tapering aperture of lesser diameter than the extrusion outlet an unexpectedly high quality highly aerated striated soap product is obtained not previously possible with prior art soap extruders.

It is therefore an object of the present invention to provide for high quality finished soap bars by means of high intensity shear refining of soap.

It is further object of the present invention to process and covert soap chips and essential ingredients to a firm quality soap extrusion by high intensity shear mixing at a rate of between 3,000 and 40,000 shear cuts per minute using either single or double combinations of augers while also post-conditioning extrusions with a high core temperature in a free space before passing out of an extrusion outlet.

These, together with various ancillary objects of the present invention are obtained by this process and apparatus for finishing soap bars, a preferred embodiment being shown in the accompanying drawings by way of example only, wherein:

BRIEF DESCRIPTION OF THE DRAWINGS

FIG. 1 is a longitudinal sectional view through a portion of an extruder housing illustrating an embodiment of the present invention; and FIG. 2 is an elevational view of a nozzle plate looking in the direction of arrows 2—2 in FIG. 1;

DETAILED DESCRIPTION OF THE INVENTION

Figure 3:
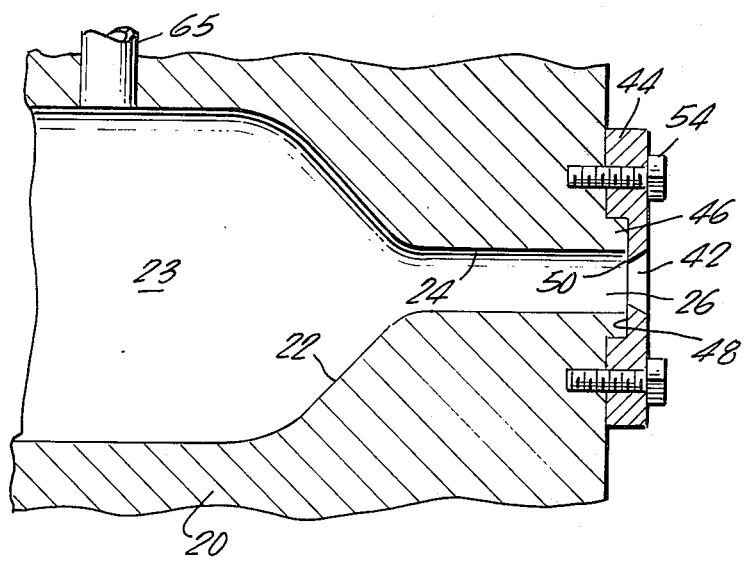
FIG. 3 is a longitudinal sectional view through a portion of an extruder housing illustrating another embodiment of the present invention.

With continuing reference to the accompanying drawing, wherein like reference numerals designate similar parts throughout the various views, and with initial attention directed to the embodiment of FIGS. 1 and 2 reference numeral 20 is used to generally designate an extruder housing in which a mass of soap is levigated and then extruded. The housing 20 terminates in an arcuate end portion 22 defining a free space 23 which communicates funnel like with an extrusion outlet 26 extending as shown at an angle of 45 degrees to the axis of the auger 28 having flights 30.

The angle may range from 0° to 60°. FIG. 3 illustrates an embodiment wherein the extrusion outlet extends in longitudinal alignment with the axis of the auger 28.

The extrusion outlet is of a very much smaller cross sectional area compared to that of the free space 23 and of the bore 32, being in the order of one twentieth the cross sectional area or less than that of the bore 32.

Soap chips and essential ingredients including dyes or coloring matter are introduced into the housing 20. The auger as shown in FIG. 4 is of the type where the flights 30, 31 and kneader blocks 60 are relatively closely spaced so that the auger may function at a rate of between 3,000 to 40,000 shear cuts per minute.

Figure 4:
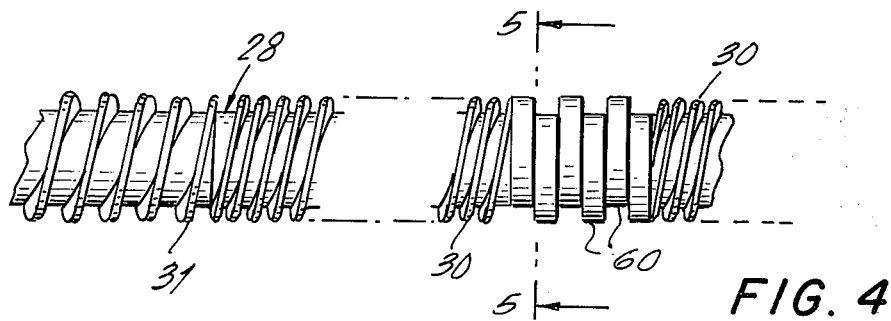
FIG. 4 is a partial elevational view of an auger illustrating an arrangement of flights and kneader blocks thereon.
Figure 5:
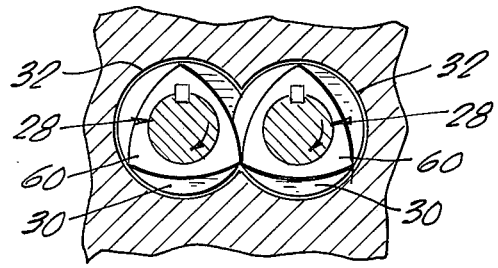
FIG. 5 is a vertical sectional view of a portion of an extruder taken along the plane of line 5—5 in FIG. 4.

The embodiment in FIG. 4 shows one arrangement of kneader block 60 and flights 30 and 31 along the axis of the auger 28. The kneader blocks 60 and the flights 30 and 31 may be placed in other various arrangements along the auger 28.

The soap after the high intensity shear mixing passes into the free space at 23. The additional soap is then forced through the free space 23 and into the extrusion outlet whereby even with the core temperature of the soap being high in the order of 127° to 147°F, the extruded mass will be post conditioned in the free space prior extrusion.

Thereafter the extruded mass passes through the extrusion outlet and thence through the paerture or apertures 42 in the nozzle plate 44. The housing is provided with a oss or tongue 46 surrounding the extrusion outlet 25 and a suitable groove 48 is provided in the nozzle plate 44.

The width of the apertures 42 are between three to six times the height thereof and are of less dimension than that of the extrusion outlet 26. Further the aperture 42 is tapered inwardly at an angle of 3°, though between 2° and 5° is acceptable. Because of the tapering a peripheral trimming edge is afforded at 50 for each aperture 42. Bolts 54 are used to removably mount the nozzle plate 44.

In operation the soap extruder is charged with soap chips, essential ingredients and any desired dye or coloring matter is injected into the soap mass. Coloring matter can be independently injected through valve 65 in the free space 23 so that the resulting extrusions through the apertures 42 will clear striations on the surface of the extrusion and the soap bars pressed or cut from these extrusions will provide for good stripe definition while also being aerated.

A latitude of modification, substitution and change is intended in the foregoing disclosure, and in some instances, some features of the present invention may be employed without a corresponding use of other features.

I claim:

1. An apparatus for high intensity shear refining of soap from a soap plodder to produce a striated product including a housing, rotating means in said housing for high intensity shear mixing of soap, said rotating means adapted to rotate at a rate of from 3,000 to 40,000 shear cuts per minute, said rotating means comprising an auger having a plurality of flights thereon, said housing having a barrel bore for receiving said auger, an extrusion outlet conduit having a smaller cross sectional area than said bore communicating with said bore, a nozzle plate secured to said housing in alignment with said extrusion outlet, said auger terminating before the end of said bore to form a free space disposed between said extrusion outlet conduit and said (bore) auger, said free space having the same cross sectional area as said barrel bore, said free space ending with a portion that converges with said extrusion outlet conduit, said conduit being angularly disposed to said free space, said conduit including a wall that forms a straight line and intersects one side of the converging portion of said free space and means communicating with said free space for introducing coloring matter into said free space.

2. The apparatus of claim 1 wherein said nozzle plate includes at least one inwardly tapering aperture of lesser dimension than said extrusion outlet conduit.

3. The apparatus of claim 2 wherein said aperture tapers at an angle of 2° to 5° with the axis of said conduit.

4. The apparatus of claim 1 wherein said outlet conduit is disposed at an angle of about 45° with said free space.

5. The apparatus of claim 2 wherein the width of said aperture is more than three times the depth thereof.

* * * * *